US012533687B2

(12) United States Patent
Silva, Jr. et al.

(10) Patent No.: US 12,533,687 B2
(45) Date of Patent: Jan. 27, 2026

(54) UPRIGHT FIRE PROTECTION SPRINKLER

(71) Applicants: Tyco Fire Products LP, Cranston, RI (US); FLN FEUERLOSCHGERATE NEURUPPIN VERTRIEBS GMBH, Neuruppin (DE)

(72) Inventors: Manuel R. Silva, Jr., Cranston, RI (US); Bernhard Abels, Tallahassee, FL (US); Kenneth Robert Brown, Chesterfield, MO (US); Stefan Vaeth, Wertheim (DE)

(73) Assignees: Tyco Fire Products LP, Cranston, RI (US); FLN FEUERLOSCHGERATE NEURUPPIN VERTRIEBS GMBH, Neuruppin (DE)

( * ) Notice: Subject to any disclaimer, the term of this patent is extended or adjusted under 35 U.S.C. 154(b) by 0 days.

(21) Appl. No.: 18/584,077

(22) Filed: Feb. 22, 2024

(65) Prior Publication Data

US 2024/0189843 A1 Jun. 13, 2024

Related U.S. Application Data

(63) Continuation of application No. 17/893,516, filed on Aug. 23, 2022, now Pat. No. 11,931,751, which is a
(Continued)

(51) Int. Cl.
*B05B 1/26* (2006.01)
*A62C 3/00* (2006.01)
(Continued)

(52) U.S. Cl.
CPC .............. *B05B 1/265* (2013.01); *A62C 35/68* (2013.01); *A62C 37/11* (2013.01); *A62C 37/14* (2013.01); *A62C 3/002* (2013.01)

(58) Field of Classification Search
CPC ......... A62C 3/002; A62C 35/68; A62C 37/11; A62C 37/12; A62C 37/14; B05B 1/262; B05B 1/265; B05B 1/267
See application file for complete search history.

(56) References Cited

U.S. PATENT DOCUMENTS

| | | | | |
|---|---|---|---|---|
| 1,412,172 A | | 4/1922 | Duley | |
| 2,135,138 A | * | 11/1938 | Kendall | B05B 1/265 239/DIG. 1 |

(Continued)

FOREIGN PATENT DOCUMENTS

| | | | | | |
|---|---|---|---|---|---|
| CA | 2425325 C | | 11/2003 | | |
| JP | 2502010 B2 | * | 5/1996 | | B05B 1/265 |
| WO | WO-2007/024554 A2 | | 3/2007 | | |

OTHER PUBLICATIONS

FM Approvals Approval Standard for Suppression Mode [Early Suppression ~ Fast Response (ESFR)] Automatic Sprinklers Class No. 2008, Oct. 2006, 89 pages.

(Continued)

*Primary Examiner* — Darren W Gorman
(74) *Attorney, Agent, or Firm* — Foley & Lardner LLP

(57) ABSTRACT

A fire protection sprinkler including a frame body having an inlet, an outlet, defining an internal passageway extending between the inlet and the outlet along a sprinkler axis. A dome shaped deflector member is centered, axially aligned with the sprinkler axis, and spaced from the outlet. The deflector member has an outer surface and an inner surface that preferably includes: a peripheral region, a central region and an intermediate region. The intermediate region includes a primary deflecting surface, and a secondary deflecting surface that is surrounded by the primary deflecting surface. The deflector member provides for generation of
(Continued)

a non-circular spray pattern defined by four zones of fluid density concentrically formed about the sprinkler axis.

13 Claims, 12 Drawing Sheets

Related U.S. Application Data continuation of application No. 16/831,465, filed on Mar. 26, 2020, now Pat. No. 11,440,032, which is a continuation of application No. 15/574,380, filed as application No. PCT/US2016/035579 on Jun. 2, 2016, now abandoned.

(60) Provisional application No. 62/170,053, filed on Jun. 2, 2015, provisional application No. 62/170,048, filed on Jun. 2, 2015.

(51) Int. Cl.

| | |
|---|---|
| ***A62C 35/68*** | (2006.01) |
| ***A62C 37/11*** | (2006.01) |
| ***A62C 37/14*** | (2006.01) |

(56) References Cited

U.S. PATENT DOCUMENTS

| | | | | |
|---|---|---|---|---|
| 2,165,477 | A | 7/1939 | Griffith | |
| 2,378,273 | A | 6/1945 | Wilhelm | |
| 2,862,565 | A | 12/1958 | Dukes | |
| 4,405,018 | A * | 9/1983 | Fischer | A62C 37/10 169/37 |
| 5,862,994 | A | 1/1999 | Pounder et al. | |
| 6,082,465 | A | 7/2000 | Retzloff | |
| 6,715,561 | B2 | 4/2004 | Franson | |
| 6,976,543 | B1 | 12/2005 | Fischer | |
| 7,343,980 | B2 * | 3/2008 | Pahila | A62C 37/11 169/41 |
| 7,819,201 | B2 | 10/2010 | Pounder et al. | |
| 8,122,969 | B1 | 2/2012 | Fischer | |
| RE44,329 | E | 7/2013 | Pounder et al. | |
| 8,602,118 | B2 | 12/2013 | Pigeon | |
| 8,905,151 | B2 * | 12/2014 | Silva, Jr. | A62C 37/12 169/41 |
| 2001/0054508 | A1 | 12/2001 | Fischer et al. | |
| 2005/0224237 | A1 | 10/2005 | Groos | |
| 2006/0060361 | A1 | 3/2006 | Pounder et al. | |
| 2008/0011491 | A1 * | 1/2008 | Thau | A62C 31/02 239/597 |
| 2008/0073088 | A1 | 3/2008 | Ide et al. | |
| 2013/0043050 | A1 | 2/2013 | Barmoav et al. | |
| 2013/0333903 | A1 | 12/2013 | Pounder et al. | |

OTHER PUBLICATIONS

IFW, U.S. Appl. No. 62/170,048, filed Jun. 2, 2015, 58 pages.
IFW, U.S. Appl. No. 62/170,053, filed Jun. 2, 2015, 53 pages.
International Search Report and Written Opinion, dated Oct. 20, 2016, International Patent Application No. PCT/US2016/035579, filed Jun. 2, 2016, 64 pages.
International Search Report and Written Opinion on PCT/US2016/035579, dated Oct. 20, 2016, 14 pages.

* cited by examiner

UPRIGHT FIRE PROTECTION SPRINKLER

CROSS-REFERENCE TO RELATED PATENT APPLICATIONS

This application is a continuation of U.S. patent application Ser. No. 17/893,516, filed Aug. 23, 2022, which is a continuation of U.S. patent application Ser. No. 16/831,465, filed Mar. 26, 2020, which is a continuation of U.S. patent application Ser. No. 15/574,380, filed Nov. 15, 2017, which is a national stage application of International Application No. PCT/US2016/035579, filed Jun. 2, 2016, which claims the benefit of priority to U.S. Provisional Patent Application No. 62/170,048, filed Jun. 2, 2015, and to U.S. Provisional Patent Application No. 62/170,053, filed Jun. 2, 2015, each of which is incorporated by reference in its entirety.

TECHNICAL FIELD

This invention relates to fire protection sprinklers, and more particularly to fire protection sprinklers for an upright orientation installation.

BACKGROUND

An automatic fire protection sprinkler is a fire suppression or control device that operates automatically when its heat-activated element is heated to its thermal rating or above allowing water to discharge over a specified area to address a fire. Automatic sprinklers can be configured for a pendent or an upright installation. An "upright sprinkler" is defined by its installation orientation in which the sprinkler is installed in such a way that the water spray is directed upwards against a fluid deflector member for distribution below and about the sprinkler.

An upright sprinkler generally includes a sprinkler frame body having an inlet, an outlet and internal passageway extending in between. Spaced from the outlet is the fluid deflector member, which for some upright sprinklers is generally domed shape or geometry. In an upright sprinkler installation, the inlet is connected to a firefighting fluid supply line of, for example water, for receipt of water at an operating pressure of the sprinkler. In an open or actuated state, the water flows from the inlet and is discharged out the outlet to impact the deflector member for distribution at some distance below the deflector in a spray pattern characterized by a defined area of coverage with a defined distribution density profile. Commercial examples of upright sprinklers include: (i) the Ultra K17-16.8 K-factor Upright Control Mode Specific Application Sprinkler; and (ii) the Model ESFR-17, 16.8 K-factor Upright Sprinkler Early Suppression, Fast Response from Tyco Fire Products; (iii) and the Victaulic K25.2 FireLock™ Standard Response, LP-46 Low Pressure Storage, Upright-Model 4603 from the Victaulic Company. Additional examples of Upright sprinklers are shown and described in U.S. Pat. Nos. 5,862,994; 7,819,201; and 8,122,969 and U.S. Patent Publication No. 2008/0073088. These known commercial upright sprinklers and upright sprinkler technology of the representative patent documents are used in a preferred manner for protection of stored commodities.

The distributed spray pattern of the sprinkler is provided by one or more dimensional parameters of the sprinkler including, for example, the size of the sprinkler outlet or orifice, the geometry of the deflecting surface(s) of the deflector member, the distance between the deflecting surface(s) and the outlet, and other structure features of the sprinkler. For the upright domed deflector, a generally concave deflecting surface is presented to the outlet of the sprinkler which can be characterized by a maximum deflector diameter, a spherical radius and an overall deflector height.

Applicant believes that the spray pattern of a sprinkler can be determined and/or evaluated by examining the spray pattern from the sprinkler in actual or simulated installation conditions. Industry accepted guidelines and standards for the installation of sprinklers, for example, those published by the National Fire Protection Association or FM Global, set installation guidelines and/or requirements for certain occupancies, such as for example, for the protection of storage occupancies and stored commodities of over twenty-five feet. In the case of storage, there are guideline requirements which require a minimum clearance of at least three feet between the deflector member and the top of the commodity. Accordingly, for storage type upright automatic fire protection sprinklers, the characteristics of a spray pattern at least three feet below an upright deflector is of interest to applicants because it is believed it can define how water distributed from the sprinkler wets the stored commodity and addresses a fire therebetween to further define the protection performance and/or limits of the upright sprinkler. It is believed that there are no known commercially available ceiling-only fire protection sprinklers or upright sprinkler technology that provide a spray pattern for storage protection at heights higher than currently commercially available.

SUMMARY OF THE INVENTION

Preferred embodiments of an upright fire protection sprinkler provide for a preferred automatic upright fire protection sprinkler assembly. The preferred sprinkler includes a fire protection sprinkler including a frame having a body having an inlet, an outlet, and defining an internal passageway extending between the inlet and the outlet along a sprinkler axis to define a preferred nominal K-factor ranging from 16.8 to 36.4. A sealing assembly is disposed in the outlet with a heat-responsive trigger to maintain the sealing assembly in the outlet. A deflector member is centered, axially aligned with the sprinkler axis, and spaced from the outlet end of the internal passageway. The deflector member has an outer surface and an inner surface that preferably includes: a peripheral region, a central region and an intermediate region between the peripheral and central region. The intermediate region preferably includes a primary deflecting surface, a secondary deflecting surface and a transition from the primary deflecting surface to the secondary deflecting surface. The transition defines a perimeter about the secondary deflecting surface such that the secondary deflecting surface is preferably surrounded by the primary deflecting surface.

Preferred embodiments of the sprinkler assembly and its deflector member define a geometries to produce a desired spray pattern below and about the sprinkler. In another preferred embodiment of an automatic upright fire protection sprinkler includes a frame having a body having an inlet, an outlet and an internal passageway extending between the inlet and the outlet along a sprinkler axis to define an orifice diameter and a nominal K-Factor ranging from 25.2-36.4 and more preferably at least 33.6. The preferred upright sprinkler includes a deflector member preferably of a domed geometry centered, axially aligned with the sprinkler axis, and spaced from the outlet of the internal passageway.

The preferred deflector member has an outer surface and an inner surface including: a peripheral region defining a peripheral edge that substantially circumscribes the sprinkler axis and a maximum deflector diameter. A central region of the deflector is spaced from the peripheral edge along the sprinkler axis to define a total deflector height; and an intermediate region and between and preferably contiguous with the peripheral region and the central region to define a spherical radius of curvature with a center disposed along the sprinkler axis. The deflector member is preferably characterized by at least one of: a ratio of a orifice diameter-to-spherical radius ranging from 0.65-0.75; a ratio of maximum deflector diameter-to-spherical radius ranging from 1.90-1.95; a ratio of maximum deflector diameter-to-total deflector height ranging from 3.45-3.55; or a ratio of spherical radius-to-total deflector height ranging from 1.80-1.85.

In another preferred aspect, embodiments of the preferred deflector member provide for generation of preferred spray patterns including a preferred substantially non-circular spray pattern in a collection grid of one cubic foot of collection buckets four feet (4 ft.) beneath the peripheral region of the deflector member with water discharged for a duration of about two minutes from the outlet at a minimum pressure ranging between 30 and 50 psi. Each of the collection buckets is centered at one-foot increments relative to a lateral axis and a longitudinal axis, the lateral and longitudinal axes being orthogonal to one another and intersecting one another to define an origin located along the sprinkler axis. The non-circular spray pattern defines at least four zones of fluid density concentrically formed about the sprinkler axis, the four zones including a first zone defining the central region of the spray pattern, a third zone defining a perimeter of the spray pattern with a second zone formed between the first and third zone, and a fourth zone formed about the third zone. The fluid density in the third zone preferably ranges from 40%-60% of the fluid density in the first zone with the first zone having at least three collection buckets each having a fluid density greater than the fluid density in each of the collection buckets of the second, third and fourth zones.

In another preferred aspect of the upright fire protection sprinkler, the sprinkler frame includes a pair of frame arms and an apex. The frame arms are diametrically opposed about the outlet and extending away from the outlet to converge toward the apex that is axially aligned with the sprinkler axis. The apex has a distal end that defines the maximum diameter of the apex. The preferred sprinkler further includes a retention member and a threaded member to fasten the deflector member to the apex. The preferred retention member defines an annular deflector engagement surface for engaging the outer surface of the deflector. The annular deflector engagement surface has an inner diameter and an outer diameter with the inner diameter being greater than the maximum diameter of the apex.

The preferred automatic upright sprinklers include a heat-responsive trigger to maintain a sealing assembly in the outlet. The heat responsive trigger is preferably one of a bulb-type trigger or a strut-lever and link assembly. In embodiments in which the heat-responsive trigger is a bulb-type trigger, a thermally responsive glass bulb having a first end and a second end is disposed on a trigger axis substantially coaxial with the sprinkler axis. The first end of the bulb defines a first seat diameter and the second end defines a second seat diameter. The bulb length between the first seat diameter and the second seat diameter is preferably greater than 1.0 inch, more preferably about 1.5 inches. In one preferred aspect, the first seat diameter is less than the second seat diameter and a ratio of the first seat diameter to the second seat diameter is approximately 0.5 to 0.6:1. In another preferred aspect, the glass bulb has a maximum wall thickness between an outer surface and an inner surface and a length between the first seat diameter and the second seat diameter, a ratio of the maximum wall thickness to the length ranging from 1:30 and 1:40.

Although the Summary of the Invention and the preferred embodiments are directed preferred embodiments of an upright fire protection sprinkler assembly for generating a preferred spray pattern, it should be understood that the preferred embodiments and features thereof can cover other upright sprinkler configuration and/or other nominal K-factors and combinations thereof which provide a spray pattern other than the preferred spray pattern. The Summary of the Invention is provided as a general introduction to some embodiments of the invention, and is not intended to be limiting to any particular sprinkler configuration or assembly. It is to be understood that various features and configurations of features described in the Summary of the Invention can be combined in any suitable way to form any number of embodiments of the invention. Some additional illustrative embodiments including variations and alternative configurations are provided herein.

BRIEF DESCRIPTION OF THE DRAWINGS

The accompanying drawings, which are incorporated herein and constitute part of this specification, illustrate exemplary embodiments of the invention and, together with the general description given above and the detailed description given below, serve to explain the features of the exemplary embodiments of the invention.

Like reference symbols in the various drawings indicate like elements.

DETAILED DESCRIPTION

Figure 1:
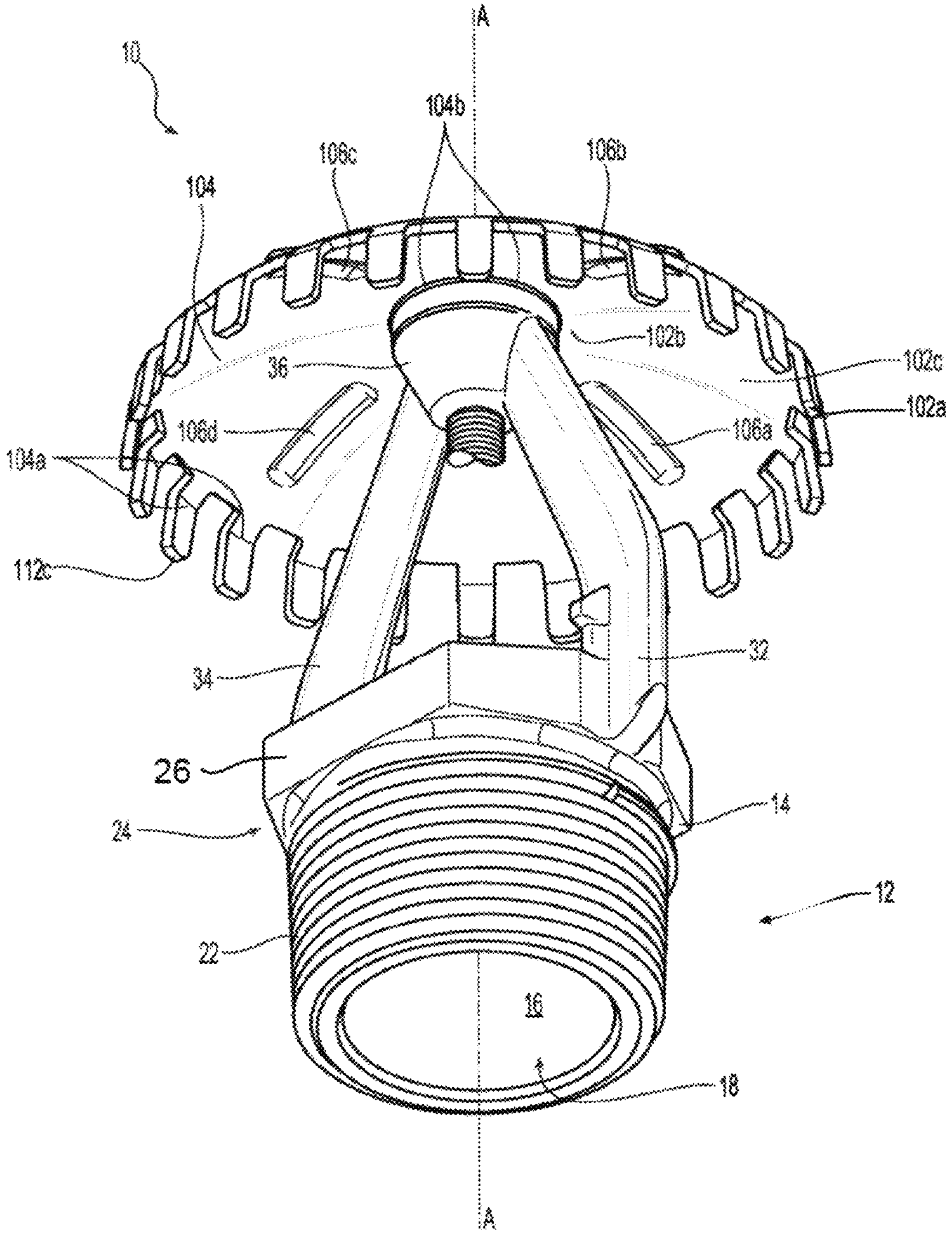
FIG. 1 is a first perspective view of a preferred sprinkler assembly in an open configuration.
Figure 2:
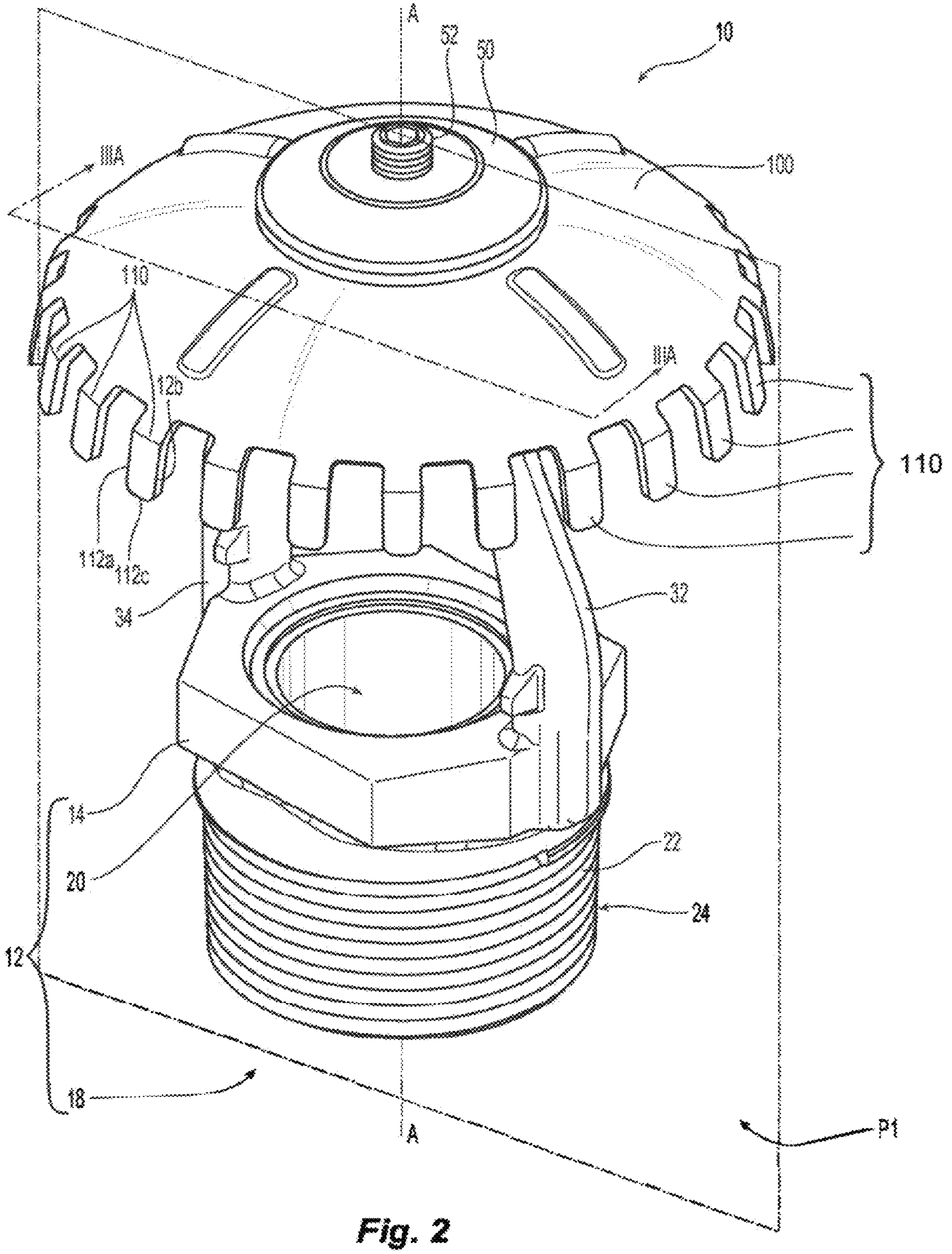
FIG. 2 is a second perspective view of the sprinkler assembly of FIG. 1.
Figure 3:
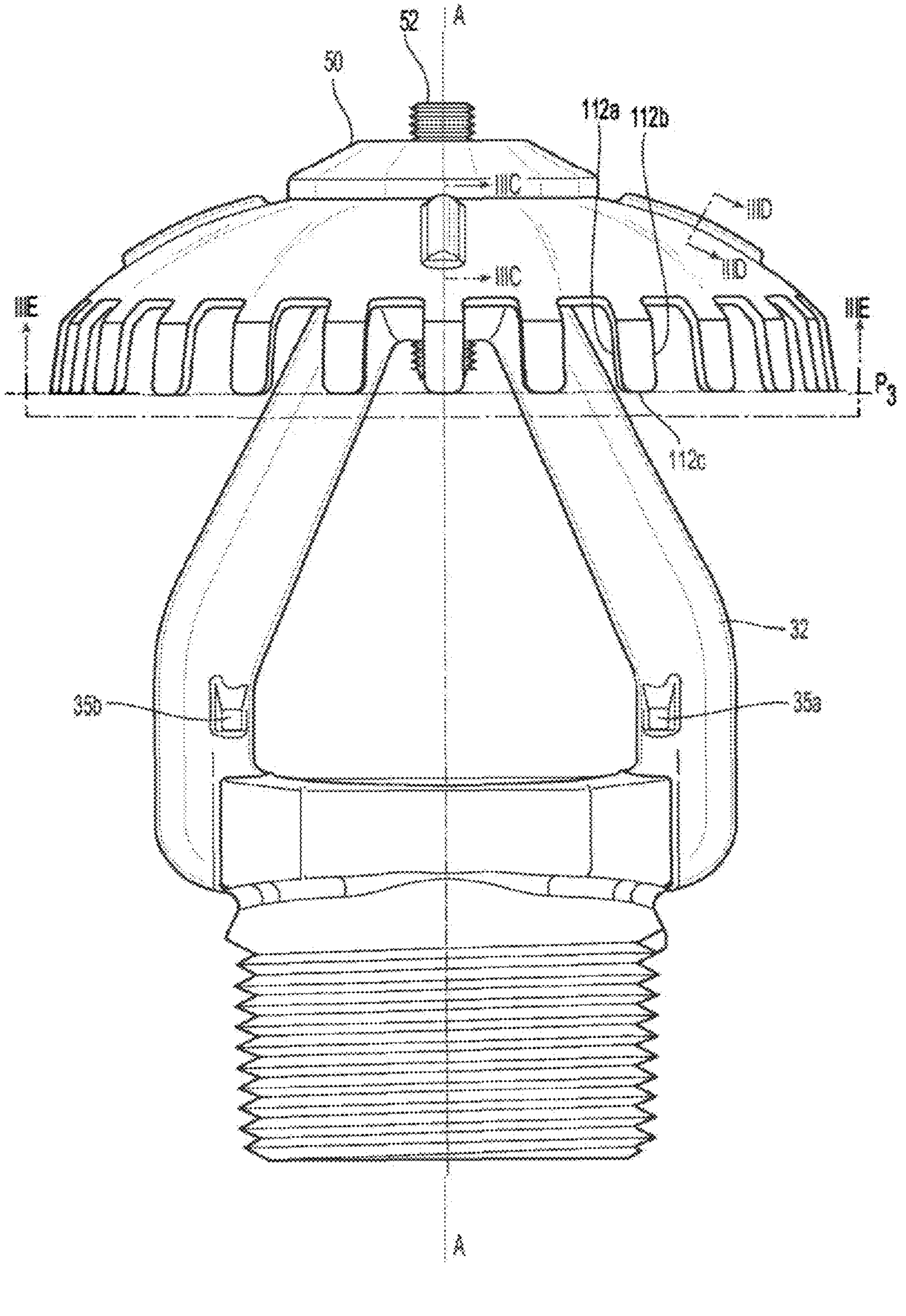
FIG. 3 is an elevation view of the sprinkler assembly of FIG. 1.

Referring to FIGS. 1, 2 and 3, a preferred upright-type fire protection sprinkler assembly 10 is shown in an open configuration or unsealed configuration that includes a preferred one-piece frame 12 having a body 14 defining an internal passageway 16 that extends between an inlet end 18 and an opposite outlet end 20 along a sprinkler axis A-A. Cooperating threads 22 provided on the outside surface 24 of the body 14 in the region of the inlet end 18 and in the internal passageway 16 permit the sprinkler 10 to be coupled to a threaded fitting for connection to a supply pipe, for delivery of water or other firefighting fluid. At the outlet end 20 of the body 14, the frame 12 is enlarged into a hexagonally shaped, circumferential flange 26, with major, opposite parallel flat surfaces or "flats." The flats are positioned for engagement with an open-ended wrench or a specially designed sprinkler wrench having a hexagonally shaped recess for threading and tightening the sprinkler 10 into the threaded fitting, for connection to the fluid supply pipe.

The frame 12 preferably includes a pair of support arms 32, 34 extending generally distally away from opposite sides of and more preferably diametrically opposed about the outlet end 20 of the body 14 to converge toward the sprinkler axis A-A and form an apex 36 at the distal end of the frame 12. The apex 36 is preferably axially aligned with axis A-A and axially spaced from the outlet end 20 of the internal passageway. A preferred deflector 100 is supported by and preferably fastened to the apex 36 so as to be axially spaced from the outlet end 20 to distribute a flow of fire-fighting fluid, e.g., water, from the outlet end 20 about the sprinkler assembly 10. The deflector 100 is preferably centrally and coaxially aligned with the sprinkler axis A-A. At the distal end, the apex 36 defines an end face that includes a central post about which the deflector 100 is disposed. The distal end of the apex 36 defines a maximum width or diameter which preferably measures about 0.7 inches. In one aspect of the preferred sprinkler assembly 10, the preferred pair of arms 32, 34 are disposed about the sprinkler body 14 in a plane P1 which bisects the deflector 100.

Referring to FIG. 1, the deflector 100 has a preferably domed geometry. Water or other firefighting fluid discharged from the outlet end 20 impacts the concave underside of the deflector 100 for distribution about and below the sprinkler assembly 10. Preferred embodiments of the deflector 100 provide means for generating a desired spray pattern. As described herein, regions of the deflector define one or more dimensional parameters and relations to provide the preferred means. Preferred embodiments of the deflector 100 also include one or more deflecting surfaces for distribution of water or other firefighting fluid about and below the sprinkler assembly 10 in a preferred manner.

Figure 3A:
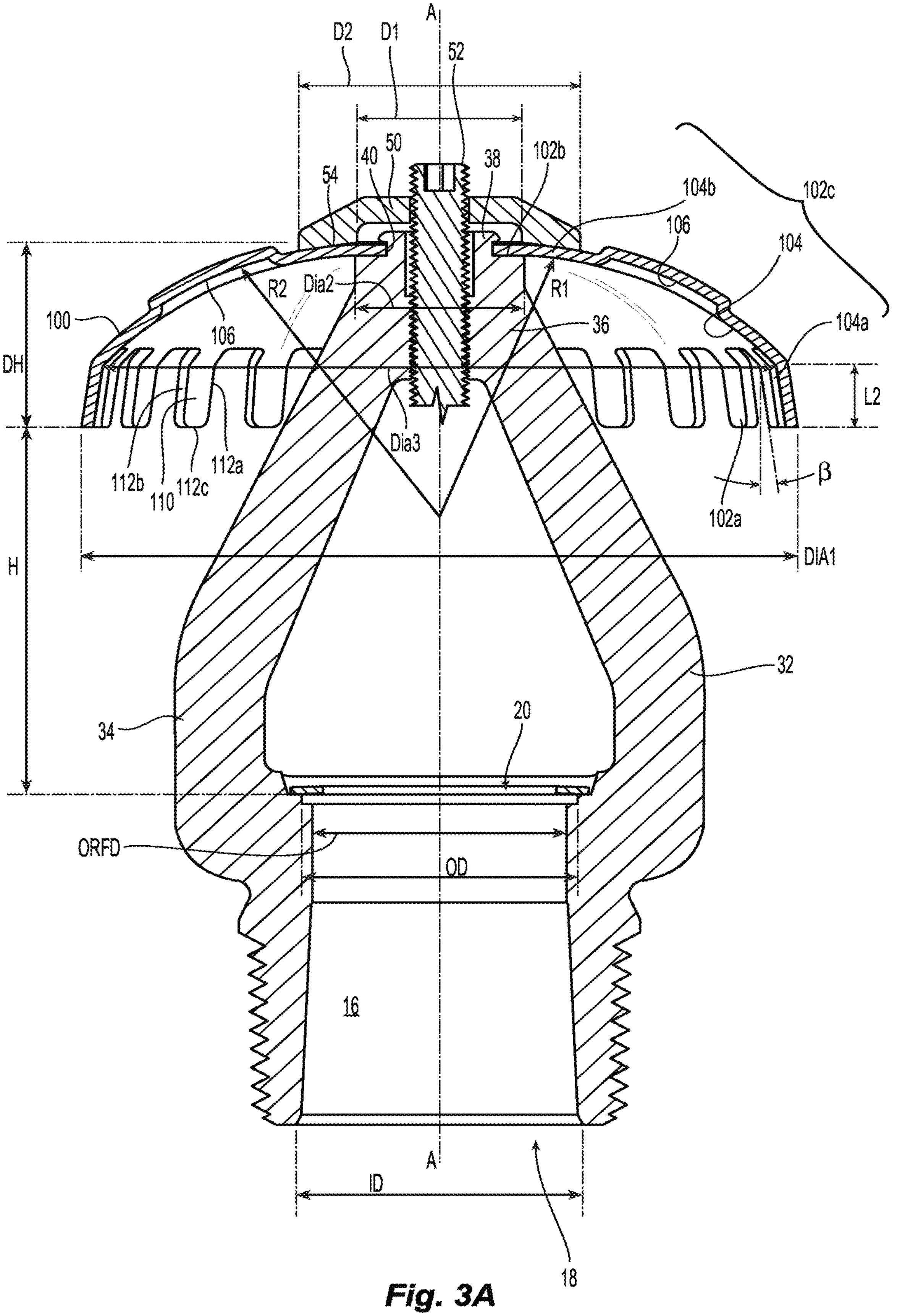
FIG. 3A is a cross-sectional elevation view of the sprinkler assembly in FIG. 2 along lines IIIA-IIIA.
Figure 3B:
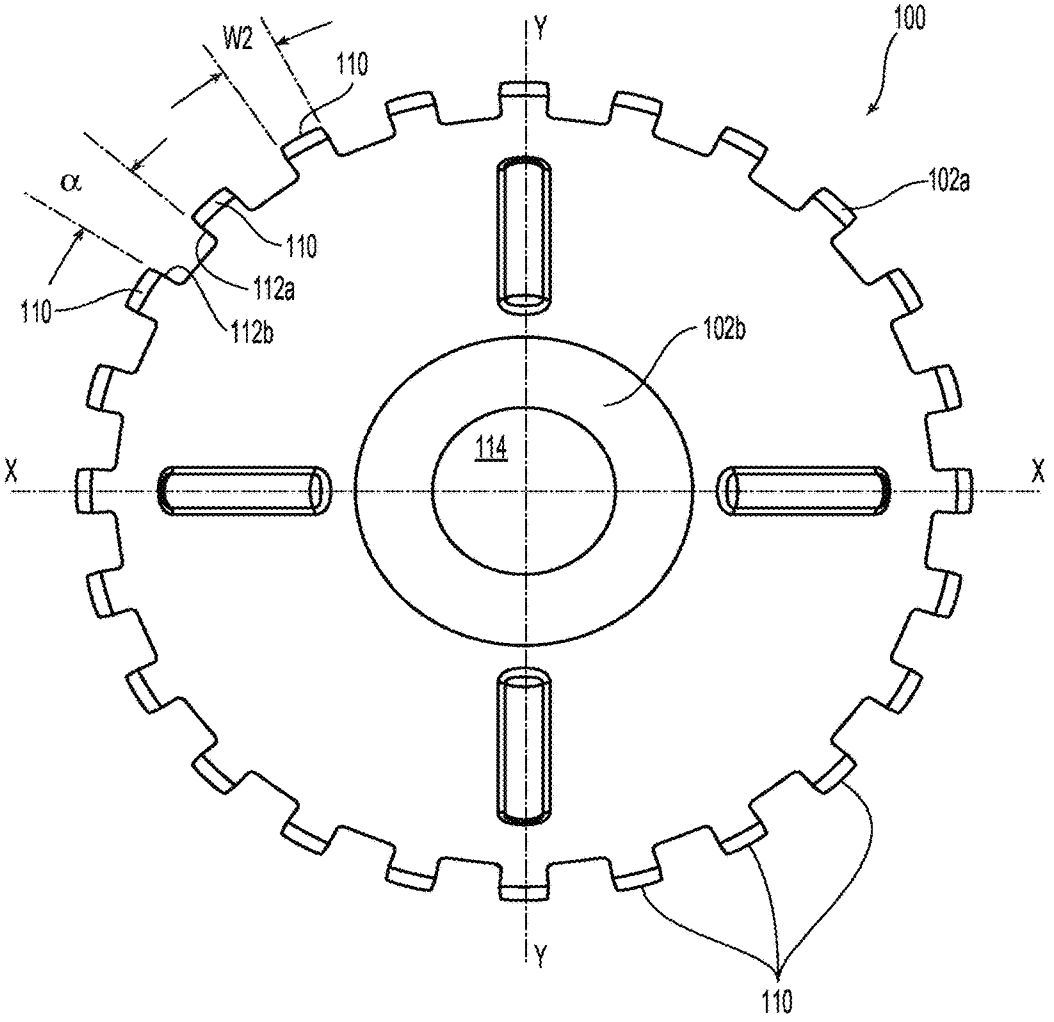
FIG. 3B is a plan view of the deflector of the sprinkler assembly in FIG. 3.

As seen in FIGS. 1 and 3A, the deflector member 100 is formed having three preferred deflecting regions: a peripheral region 102*a*, a central region 102*b* defining a central axis of the deflector axially aligned along the sprinkler axis A-A; and an intermediate region 102*c* extending between the peripheral and central regions 102*a*, 102*b*.

Figure 3C:
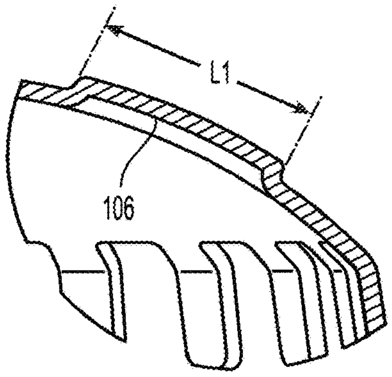
FIG. 3C is a detailed partial cross-sectional view of the deflector of the sprinkler assembly in FIG. 3A.
Figure 3D:
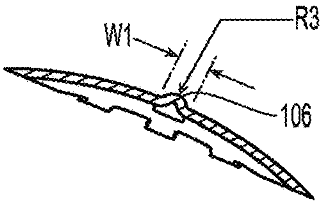
FIG. 3D is a detailed cross-sectional view of the deflector of the sprinkler assembly in FIG. 3 along lines IIID-IIID.
Figure 3E:
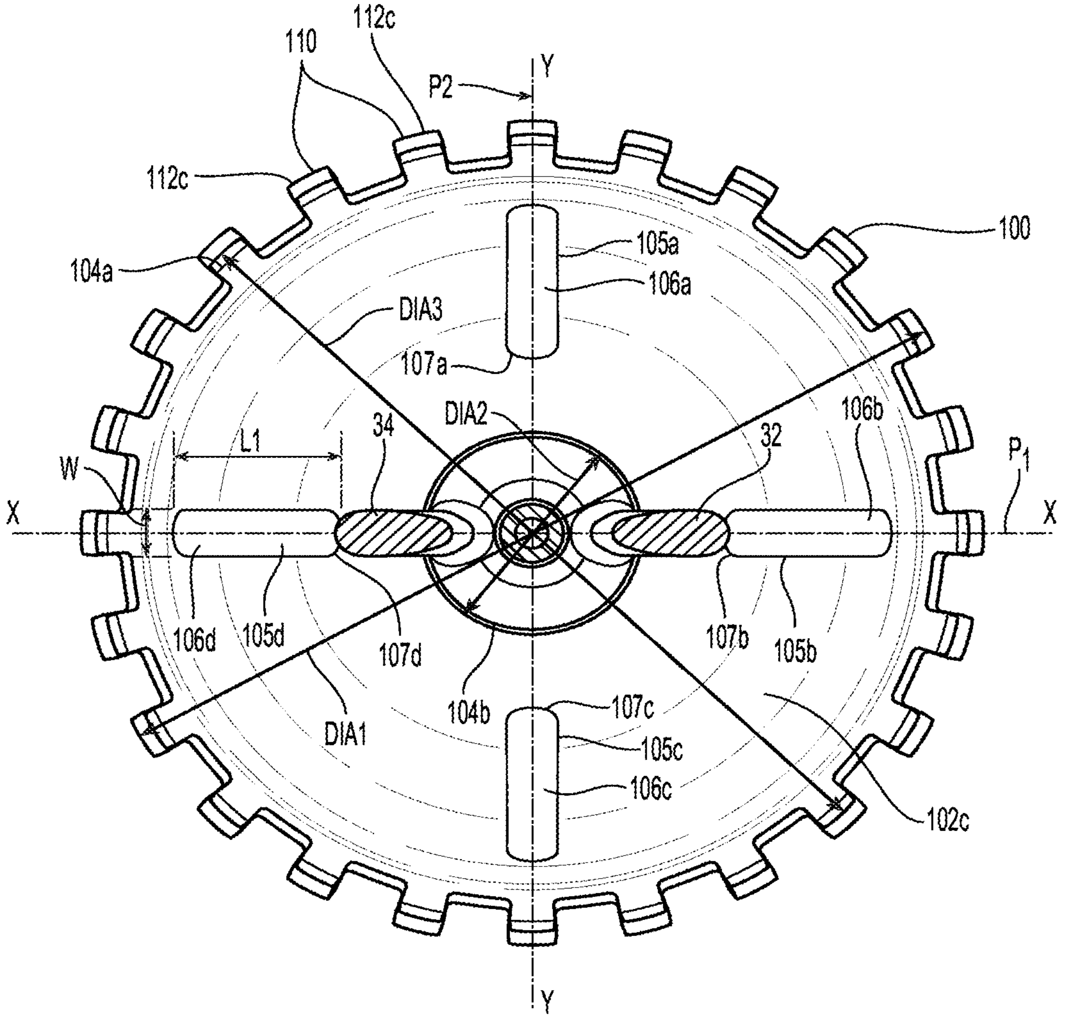
FIG. 3E is a detailed cross-sectional view of the sprinkler assembly in FIG. 3 along lines IIIE-IIIE.

In a preferred embodiment, the intermediate region 102*c* is preferably defined by a primary deflecting surface 104. A preferred embodiment of the primary deflecting surface 104 is defined by a spherical radius of curvature R1 of about 1.5 inches and more preferably 1.6 inches to define the domed geometry, with the center of curvature preferably located along the central axis of the deflector member 100, which is coaxially aligned with the sprinkler axis A-A. As used herein, the term "about" is understood as being within a range of normal engineering or manufacturing tolerance of the stated value. Unless otherwise clear from context, all numerical values provided herein are modified by the term about. With reference to FIGS. 3A and 3E, the preferred intermediate region 102*c* and primary deflecting surface 104 define a peripheral junction or boundary 104*a* with the peripheral region 102*a* and further define an internal junction or boundary 104*b* contiguous with the central region 102*b*.

The preferred peripheral region 102*a* of the deflector member 100 includes a plurality of spaced apart tines 110. Each tine 110 defines a preferred length L2 of ranging 0.25-0.3 inch and is more preferably about 0.28 inch extending from the preferred peripheral junction 104*b* of the intermediate region 102*c*. Each tine 110 is preferably bent from the peripheral junction 104*a* to define a bend line and a preferred included angle β of 8°-10° and more preferably 8° with respect to a vertical parallel to the sprinkler axis A-A, as seen for example in FIG. 3A. Each tine 110 also preferably includes a pair of lateral edges 112*a*, 112*b* which extend to preferably terminate at a substantially linear edge 112*c* that is disposed contiguously with and preferably substantially perpendicular to each of the lateral edges 112*a*, 112*b*. The transition from the lateral edges 112*a*, 112*b* to the linear edge 112*c* can be defined by a radiused corner of about 0.05 inch. The linear edges 112*c* of the tines 110 collectively define a discontinuous peripheral edge of the deflector 100 and its peripheral region 102*a* that substantially circumscribes the sprinkler axis A-A and is preferably disposed in a common plane P3 that extends perpendicular to the sprinkler axis A-A.

In the preferred embodiment of the deflector 100 of FIG. 3A-3E, the peripheral region 102*a* is defined by twenty-four (24) equiangularly spaced apart tines 110 with adjacent lateral edges 112*a*, 112*b* spaced apart by an angle α of fifteen degrees (15°) with each tine 110 defining a width W2 preferably of about 0.15 inch. In the common plane P3, the terminal edges 112*c* define a substantial circular geometry, the preferred maximum diameter Dia1 of the formed deflector being about three inches and more preferably ranging from 3.0-3.1 inches and is even more preferably 3.04 inches and yet even more preferably 3.07 inches. In a preferred embodiment of the deflector 100, the internal junction 104*b* defines an internal diameter Dia2 of about 0.75 inch and the peripheral junction 104*a* defines another internal diameter Dia3 ranging from 2¾ inches (2.75 in.) to less than 3 inches and is more preferably about 2⅞ inches (2.875 in.). The total height DH of the preferred deflector member 100 axially measured from the outer surface of the central region 102*b* to the common plane P3 is over ¾ of an inch and more preferably ranges from ⅞ inch (0.875 in.) to one inch and is more preferably ⅞ inch (0.875 in.).

In a preferred embodiment, the intermediate region 102*c* includes one or more secondary deflecting surfaces 106 and a transition from the primary deflecting surface 104 to the secondary deflecting surface 106. As shown in FIG. 3E, four secondary deflecting surfaces 106*a*, 106*b*, 106*c*, 106*d* are preferably formed and equiangularly spaced about the central region 102*b* and more preferably formed and equiangularly spaced about the primary deflecting surface 104. In the preferred embodiment, the secondary deflecting surfaces 106*a*, 106*b*, 106*c*, 106*d* are elongate formations extending radially in the direction of perpendicular axes X-X, Y-Y, that are disposed respectively in perpendicular planes P1, P2, which divide the deflector member 100 into substantially equal part quadrants. Accordingly, the four secondary deflecting surfaces 106*a*, 106*b*, 106*c*, 106*d* are preferably spaced at 90 degrees from one another. Moreover, each of the secondary deflecting surfaces 106*a*, 106*b*, 106*c*, 106*d* is preferably equiradially spaced from the central region 102*b* of the deflector with diametrically opposed secondary deflecting surfaces (106*a*, 106*c*), (106*b*, 106*d*) having their radial inner ends 107*a*, 107*b*, 107*c*, 107*d* spaced at a preferred linear distance of about 1.3 inches from one another.

As seen in FIG. 3E, each of the secondary deflecting surfaces 106 is disposed between the peripheral and inner junctions 104*a*, 104*b* of the intermediate region 102*c*. Moreover, each of the secondary deflecting surfaces 106 is surrounded by a transition 105, which defines a perimeter 105*a*, 105*b*, 105*c*, 105*d* about each of the secondary deflecting surfaces 106*a*, 106*b*, 106*c*, 106*d* such that each secondary deflecting surface 106 and its perimeter 105 is surrounded by the primary deflecting surface 104. Referring to FIGS. 3A and 3C, each of the secondary deflecting surfaces 106 preferably extends in the direction of the axes X-X, Y-Y toward the sprinkler axis to define an arcuate profile that is substantially continuous and parallel to the radius of curvature of the primary deflecting surface 104. Thus, each of the preferred secondary deflecting surfaces is preferably formed to a radial depth R2 greater than the spherical radius R1. Moreover, each secondary deflecting surface 106 and its perimeter 105 define a preferred axial length L1 of about 0.5 inch and more preferably 0.6 inch. Accordingly in a preferred aspect, the perimeter or transition 105 about the secondary deflecting surface 106 is elongate, defining a width and a length with the length greater than the width. In cross-section, as seen in FIG. 3D, the secondary deflecting surfaces 106 form a substantially v-shaped groove preferably contiguous with the perimeter or transition 105 and have a preferred maximum width W1 of about 0.2 inch and more preferably 0.175 inch. In one preferred embodiment, the secondary deflecting surface 106 defines a radius of curvature R3 of about 0.075 inch and more preferably 0.08 inch in its cross-section profile relative to its axial length and the axis along which the elongate formation extends.

The one or more secondary deflecting surfaces may be alternately defined by variation in one or more characteristics of the secondary deflecting surfaces 106. For example, each of the secondary deflecting surfaces 106*a*, 106*b*, 106*c*, 106*d* can be discontinuous as being defined by a plurality of formations extending along or in the direction of the axes, X-X, Y-Y. Further in the alternative, the secondary deflecting surface can be defined by a formation in which its depth, i.e., radius of curvature R2, varies over the length of the formation relative to the primary deflecting surface. The width W1 of the secondary deflecting surfaces 106 can vary over the length of the formation. Alternative embodiments of the secondary deflecting surfaces 106 can extend over a path that intersects the bisecting planes P1, P2 several times in a zig-zag like fashion. The secondary deflecting surfaces 106 of the preferred embodiments of the deflector member 100 extend linearly along axes, X-X, Y-Y, which intersect a tine of the deflector. Alternative embodiments of the secondary deflecting surfaces 106 could extend along an axis that extends to the periphery of the deflector between tines.

The deflector member 100 is preferably formed from a planar blank member of uniform thickness preferably about 0.05 inch thick, but any other thickness can be used provided the deflector member can be formed and provide sufficient rigidity under a discharged fluid load as described herein. As shown, the preferred deflector member 100 is formed such that the outer surface of the deflector member 100 is the mirror image or impression of the inner surface of the deflector member 100. Accordingly, the outer surface of the deflector member 100 can be a function of the formation of the inner surface of the deflector member 100. The deflector member 100 however can be alternately formed such that the outer surface is different and/or independent of the formation of the inner surface. Accordingly, the outer surface of the deflector member 100 can define a variable profile over its surface including for example, one or more projections, surface treatments, or surface indentions or grooves.

The deflector 100 is preferably mechanically fastened to the sprinkler frame 12. Referring to FIGS. 3A and 3E, the preferred central region 102*b* of the deflector is a substantially planar surface extending perpendicular to the sprinkler axis A-A. The central region 102*b* of the deflector 100 is preferably configured for engaging the distal end of the apex 36 and securing the deflector 100 to the sprinkler frame 12. Accordingly, the planar central region 102*b* defines a central hole or opening 114 sized for receiving the distal end 38 of the sprinkler frame 12. The planar surface of the central region 102*b* preferably engages a planar shoulder 40 formed about the distal end 38 of the frame 12.

In a preferred embodiment of the sprinkler assembly 10, the deflector 100 is secured to the sprinkler frame 12 by a retention member 50 and a threaded member 52. The threaded member 52 forms a threaded engagement with the retention member 50 and the apex 36 of the frame with the deflector 100 disposed between the retention member 50 and the distal planar shoulder 40 of the frame 12. The retention member 50 defines a preferably annular deflector engagement surface 54 for engaging the outer surface of the deflector 100. The deflector engagement surface 54 of the retention member is preferably annular in shape having an inner diameter D1 of about 0.7 inch and an outer diameter D2 of about 1.2 inches. Moreover, the inner diameter D1 is preferably at least as great as the maximum diameter of the apex 36 to define a preferred minimum ratio of retention member inner diameter-to-maximum apex diameter of 1:1. The area of the engagement surface 54 of the retention member 50 distributes a holding force from the threaded engagement between the retention member 50 and threaded or screw member 52 to statically hold the deflector 100 in place under a full load of fluid discharge delivered at a discharge pressure of 50 psi or greater. The preferred retention member 50 and deflector 100 define a preferred maximum deflector diameter Dia1-to-retention member diameter D2 ratio of about 2.5:1. The outer surface of the retention member 50 is shown as substantially frustoconical. However, it should be understood that the outer surface of the retention member 50 can define an alternate profile that includes, for example, tool engagement flats or a more cylindrical profile provided the retention member 50 can secure the deflector 100 to the frame 12.

The preferred deflector 100 is secured to the frame 12 to preferably orient the secondary deflecting surfaces 106*a*, 106*b*, 106*c*, 106*d* relative to the frame arms 32, 34. More specifically, as seen in FIG. 3E, the deflector 100 is preferably oriented to locate one diametrically opposed pair of secondary deflecting surfaces 106*b*, 106*d* and its axis X-X in the plane P1 aligned with the frame arms 32, 34. Accordingly, the second preferred pair of diametrically opposed secondary deflecting surfaces 106*a*, 106*c* and its axis Y-Y are preferably aligned in the second plane P2 of the frame arms 32, 34. The frame arms 32, 34 are preferably symmetrical about the plane P1 substantially along the axial length of the arms. The arms can define a variable cross-sectional area or profile along their length. The cross-sectional area may vary in size or, alternatively, the arms can include one or more formations along their length to vary the cross-sectional profile.

Referring to the cross-sectional view of the sprinkler assembly 10 in FIG. 3A, the internal passageway 16 defines a preferred length of about 1.540 inches from inlet 18 to outlet 20 with an internal bore diameter and more particularly an orifice diameter ORFD proximate the outlet 20. The orifice diameter ORFD preferably ranges from 1.05-1.1 inches and is more preferably 1.084 inches. The passageway 16 preferably varies for at least a portion along its length so as to taper narrowly in the direction from inlet 18 to outlet 20 with a preferably beveled edge at the inlet 18. The outlet 20 is preferably beveled with a preferred outlet diameter OD ranging from 1.15-1.2 inches and more preferably 1.175 inches.

The internal passageway 16 defines preferred discharge characteristics of the sprinkler 10. A sprinkler's discharge characteristics can be identified by a nominal K-factor which is defined as an average flow of water in gallons per minute through the internal passageway divided by a square root of pressure of water fed into the inlet end of the internal passageway in pounds per square inch gauge (psig): Q=KVP where P represents the pressure of water fed into the inlet end of the internal passageway through the body of the sprinkler, in pounds per square inch gauge (psig); Q represents the flow of water from the outlet end of the internal passageway through the body of the sprinkler, in gallons per minute (gpm); and K represents the nominal K-factor constant in units of gallons per minute divided by the square root of pressure expressed in psig. Nominal K-factors (with the K-factor range shown in parenthesis) can include: (i) 14.0 (13.5-14.5) GPM/(PSI)$^{1/2}$; (ii) 16.8 (16.0-17.6) GPM/(PSI)$^{1/2}$; (iii) 19.6 (18.6-20.6) GPM/(PSI)V; (iv) 22.4 (21.3-23.5) GPM/(PSI)$^{1/2}$; (v) 25.2 (23.9-26.5) GPM/(PSI)$^{1/2}$; (vi) 28.0 (26.6-29.4) GPM/(PSI)$^{1/2}$; (vii) 33.6 (31.9-35.28) GPM/(PSI)$^{1/2}$; and 36.4 (34.6-38.2) GPM/(PSI)V2.

The fire protection sprinkler 10 and internal passageway 16 define a preferred nominal discharge coefficient or K-factor of greater than about 16.0. In preferred embodiments, the nominal K-factor can be between about 16.8 and about 28.0, preferably between about 22.4 and about 33.6, more preferably between about 25.2 and about 36.4, and most preferably is a nominal K-factor of 33.6 GPM/(PSI)$^{1/2}$. For the preferred sprinkler assembly 10 and desired fluid distribution densities, it has been determined that the sprinkler assembly 10 defines a minimum working pressure of 30-50 psi. for a preferred working flow of about 240 gpm and more preferably 238 gpm.

The preferred means for generating a desired spray pattern is preferably defined by the inter-dimensional relationships of two or more dimensional characteristics of the deflector and sprinkler frame. The desired spray pattern is effective in the protection of storage occupancies and commodities. The preferred means includes a preferred deflector characterized by at least one of: (i) an orifice diameter-to-spherical radius ratio (ORFD:R1) ranging from 0.65-0.75; (ii) a maximum deflector diameter-to-spherical radius ratio (Dia1:R1) ranging from 1.90-1.95; (iii) a maximum deflector diameter-to-total deflector height ratio (Dia1:DH) ranging from 3.45-3.55; and (iv) a spherical radius-to-total deflector height ratio (R1:DH) ranging from 1.80-1.85. Alternatively or additionally, the means is defined by a preferred maximum deflector diameter-to-outlet diameter ratio (Dia1:OD) of about 2.6:1; and/or the orifice defines a preferred maximum deflector diameter-to-orifice diameter ratio (Dia1:ORFD) of about 2.8:1. In another preferred aspect, the preferred means of the deflector 100 includes a ratio of the maximum deflector diameter Dia1-to-spherical radius R1 to be about 2:1. Alternatively or additionally, the deflector 100 defines a maximum deflector diameter-to-deflector height ratio (Dia1:DH) of about 3.5:1.

Generally a desired spray pattern is non-circular, defined by a perimeter with two or more linear edges centrally or equidistantly disposed about the sprinkler 10. More preferably, the spray pattern is substantially rectangular and more preferably a square formed preferably within a ten foot-by-ten foot (10 ft.×10 ft.) perimeter centered about the sprinkler axis A-A in a plane preferably located about three-five and more preferably four feet below the peripheral region 102*a* of the deflector 100 and perpendicular to the sprinkler axis A-A. Even more preferably, the preferred spray pattern includes a high concentration of fluid distribution in the central area of the spray pattern with decreasing fluid distribution in the lateral outward direction away from the sprinkler axis A-A toward the perimeter of the substantially square pattern. The perimeter of the spray pattern is preferably defined by a distribution that is sufficient to effectively address a fire. Moreover, in one preferred aspect of the spray pattern, little to no fluid is distributed at or beyond six feet (6 ft.) from the sprinkler axis. Additionally, in the areas proximate to or along the edges of the preferably substantially square pattern, the fluid density preferably decreases in directions from the center of the edge toward the corners of the perimeter. In a preferred spray pattern, the areas adjacent and outside the corners of the ten-by-ten foot perimeter receive little to no fluid from the spray pattern.

Figure 4A:
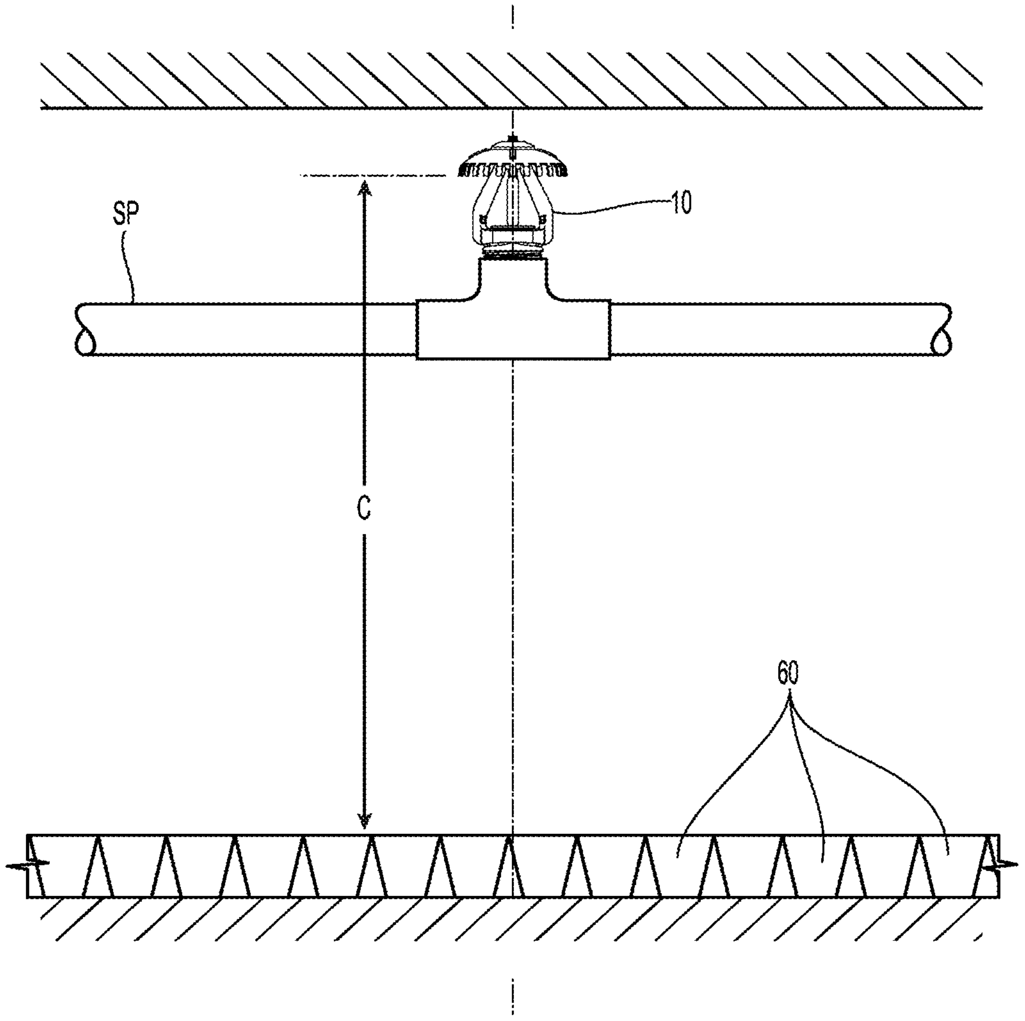
FIG. 4A is a schematic view of a fluid distribution test set-up for testing the sprinkler assembly of FIG. 1.
Figure 4B:
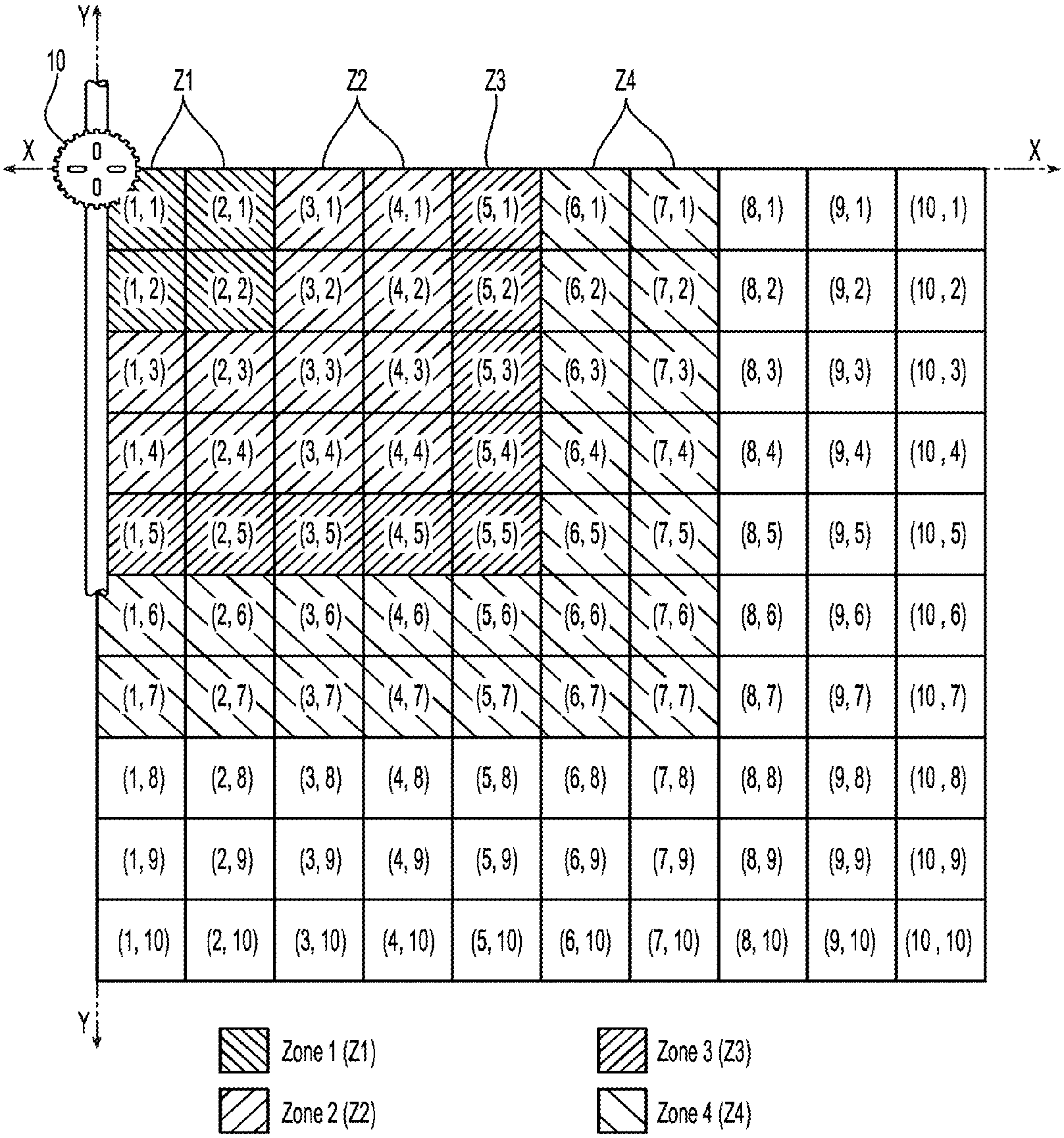
FIG. 4B is a schematic plot of the fluid distribution from the sprinkler assembly of FIG. 1 tested in the set-up of FIG. 4A.

To evaluate the performance the preferred means to generate a desired spray pattern, the sprinkler assembly can be installed in a fluid distribution test arrangement as shown in FIGS. 4A and 4B with water distributed and collected in one quarter of a 20 ft.×20 ft. grid area (400 sq. ft.) beneath the assembly. As shown in FIG. 4B, one hundred collection buckets were installed to capture one "quadrant" of the spray pattern distribution from a sprinkler 10. One corner of the 10 ft.×10 ft. grid array of collection pans 60 is centered beneath the sprinkler 10. Generally, a preferred sprinkler is installed and centered in an open state above a (20×20) grid of one cubic foot (1 ft.$^3$) collection pans 60 a distance C of four feet (4 ft.) to evaluate the spray performance of the sprinkler assembly at or above the minimum clearance requirement of at least thirty-six inches (36 in.) between the deflector 100 and the top of the commodity for storage protection. Water was fed from a single direction along a supply pipe SP to which the sprinkler assembly 10 was coupled in a preferred upright orientation. The sprinkler assembly 10 was oriented such that the frame arms 32, 34 and the co-planar pair of diametrically opposed secondary deflecting surfaces 106 are aligned with the supply pipe SP; and accordingly aligned and perpendicular to the respective sides of the grid of collection pans 60. In the distribution test, water was discharged from the sprinkler assembly 10 for a duration of about two minutes (2 min.) at a pressure of 30 psi, which translated to a discharge rate of about 184 gallons per minute (gpm) for the preferred K-33.6 sprinkler. At the conclusion of the distribution, the collection pans can be evaluated to determine the fluid distribution density from the preferred sprinkler assembly 10.

Shown in 4B is a layout of the collection pans each identified by its (X,Y) coordinate relative to the sprinkler 10. For example, collection pan (3,4) is the pan located three feet along the X-axis and four feet down the Y-axis. The collection pans 60 are grouped into concentric substantially rectangular zones of a desired spray pattern. Zone 1 (Z1) is defined by the four collection pans (1,1); (1,2); (2,1); (2,2) below the sprinkler 10 which collect the central portion of the spray pattern. Zone 3 (Z3) is defined by the collection pans at the perimeter of the spray pattern (5,1); (5,2); (5,3); (5,4); (1,5) (2,5); (3,5); (4,4); and (5,5) in which collection pan (5,5) is located at the corner of the preferred spray pattern. Accordingly, the collection pans of Zone 3 (Z3) define the outline of a preferred non-circular and substantially square spray pattern. Zone 2 (Z2) is defined by the collection pans 60 between Zone 1 (Z1) and Zone 3 (Z3). Zone 4 (Z4) is defined by the group of collection pans surrounding the preferred perimeter Z3. Generally, Zone 4 (Z4) preferably has a low concentration in fluid distribution corresponding to a drop in fluid distribution at the perimeter of the preferred spray pattern in Zone 3.

Generally, the preferred spray patter is bound by a non-circular perimeter defined by the L-shaped Zone 3 (Z3) of the quadrant. Zone 4 preferably amounts to less than five percent and is preferably zero of the total fluid distribution or density of the spray pattern. The water distribution of the spray pattern at the collection pan (5,5) preferably reveals a distinct corner-like edge with the adjacent pans in the fourth zone preferably having no fluid collected therein. The preferred spray pattern preferably includes a concentration of fluid density in the central portion of the spray pattern such that 30% to 35% of the total distribution is preferably within Zone 1 (Z1) and centered beneath the sprinkler 10. Moreover, of the four distribution pans shown of Zone 1 (1) quadrant, three of the pans would collect at a density greater than any pan in the other three zones. The distribution density preferably decreases radially from the sprinkler 10 and at the perimeter of the preferred spray pattern with the distribution density in Zone 3 (Z3) preferably ranging from 40-60% of the density of Zone 1 (Z1) and more preferably ranging from 50-60% and even more preferably is about 58%.

Figure 5A:
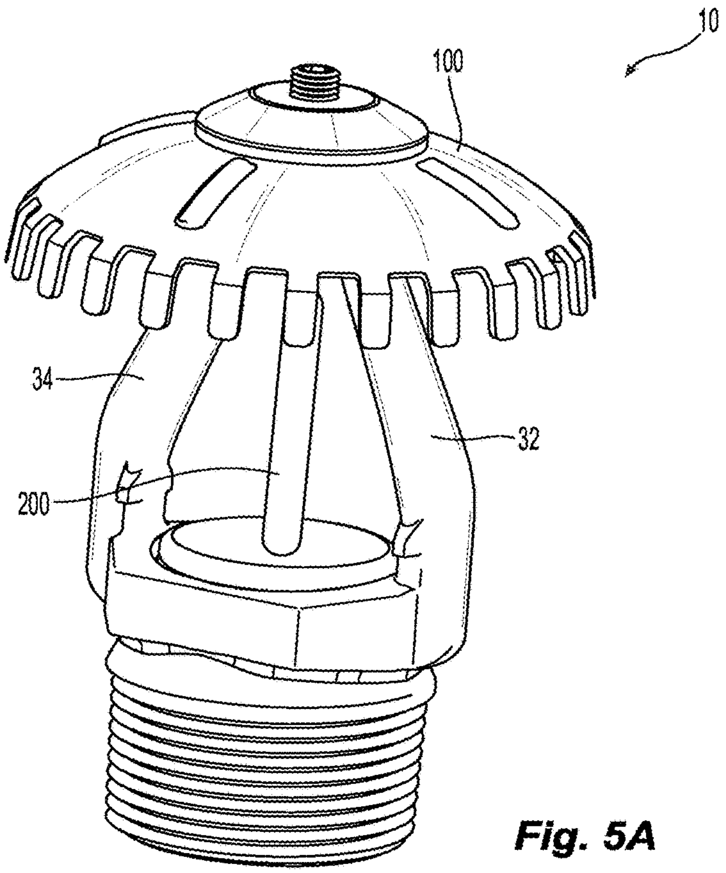
FIG. 5A is a perspective view of the sprinkler assembly of FIG. 1 in a sealed configuration with a glass bulb thermally responsive trigger.
Figure 5B:
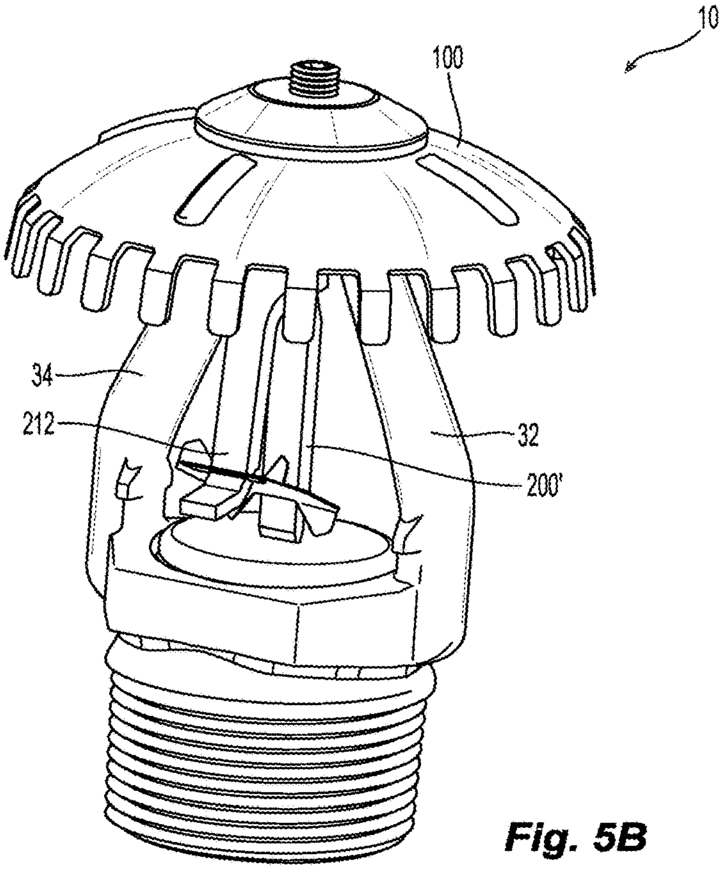
FIG. 5B is a perspective view of the sprinkler assembly of FIG. 1 in a sealed configuration with a strut and lever thermally responsive trigger.

To control the discharge of fluid from the frame outlet 20, the preferably "automatic" sprinkler assembly 10 includes a preferred heat-responsive trigger 200 or any suitable trigger, such as for example, an electrically actuated trigger. The preferred thermally responsive trigger 200 could be any one of a bulb-type trigger, as seen for example, in FIG. 5A, or alternatively a strut-lever and link assembly 200', as shown in FIG. 5B. A scaling assembly 300 is disposed within the outlet 20 and supported in place by the trigger 200 to maintain the sprinkler assembly 10 in an unactuated, standby or non-fire condition and control the discharge of fluid. In response to a predetermined temperature condition indicative of a fire, the heat-responsive trigger 200 actuates, releasing the internal sealing assembly 300, thereby allowing the flow of water supplied to the inlet end 18, through the internal passageway 16, and out through the outlet end 20.

The heat-responsive trigger 200, 200' and its actuation is defined by its nominal temperature rating and Response Time Index, or RTI. The trigger 200 is configured to actuate at or define a preferred nominal temperature rating of 286° F. and define a preferred RTI of 135 $meter^{1/2}sec^{1/2}(m^{1/2}s^{1/2})$ to about 160 $meter^{1/2}sec^{1/2}$ $(m^{1/2}s^{1/2})$. The trigger may have another nominal temperature rating provided it is suitable for the hazard, occupancy or storage being protected, including, for example as defined under NFPA 13: (i) ordinary 135° F.-170° F.; (ii) intermediate 175° F.-225° F.; (iii) high 250° F.-300° F.; (iv) extra high 325° F.-375° F.; (v) very extra high 400° F.-475° F.; and (vi) ultra high 500° F.-575° F. Moreover, the heat-responsive trigger 200 can define alternate ranges of RTI, which can range from at least 130 $meter^{1/2}sec^{1/2}$ $(m/s^{1/2})$ to 160 $meter^{1/2}sec^{1/2}$ $(m^{1/2}s^{1/2})$, preferably at least 135 $meter^{1/2}sec^{1/2}$ $(m^{1/2}s^{1/2})$ to about 160 $meter^{1/2}sec^{1/2}$ $(m^{1/2}s^{1/2})$, more preferably 150 $meter^{1/2}sec^{1/2}$ $(m^{1/2}s^{1/2})$ to about 160 $meter^{1/2}sec^{1/2}$ $(m^{1/2}s^{1/2})$, and even more preferably 160 $meter^{1/2}sec^{1/2}$ $(m^{1/2}s^{1/2})$. Further in the alternative, the RTI can range to 50 $meter^{1/2}sec^{1/2}$ $(m^{1/2}s^{1/2})$ or less so as to be a "quick" or "fast" response type sprinkler.

Figure 6A:
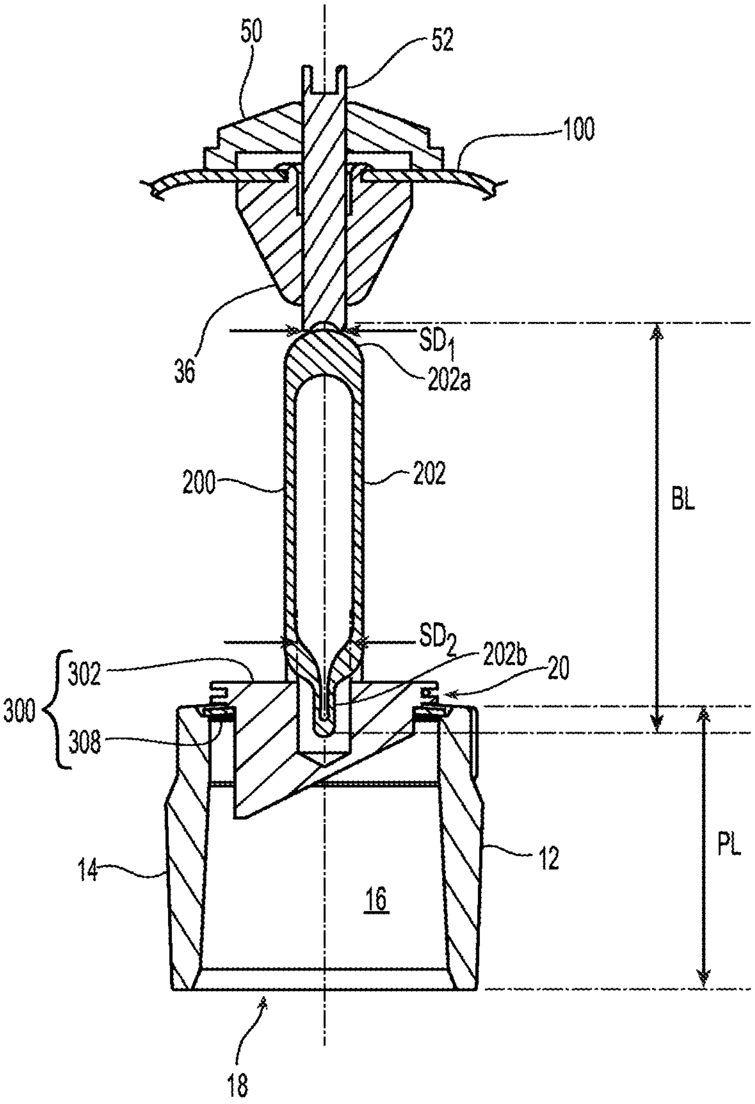
FIGS. 6A-6C are various views of the thermally responsive trigger and sealing assembly in the sprinkler assembly of FIG. 5A.
Figure 6B:
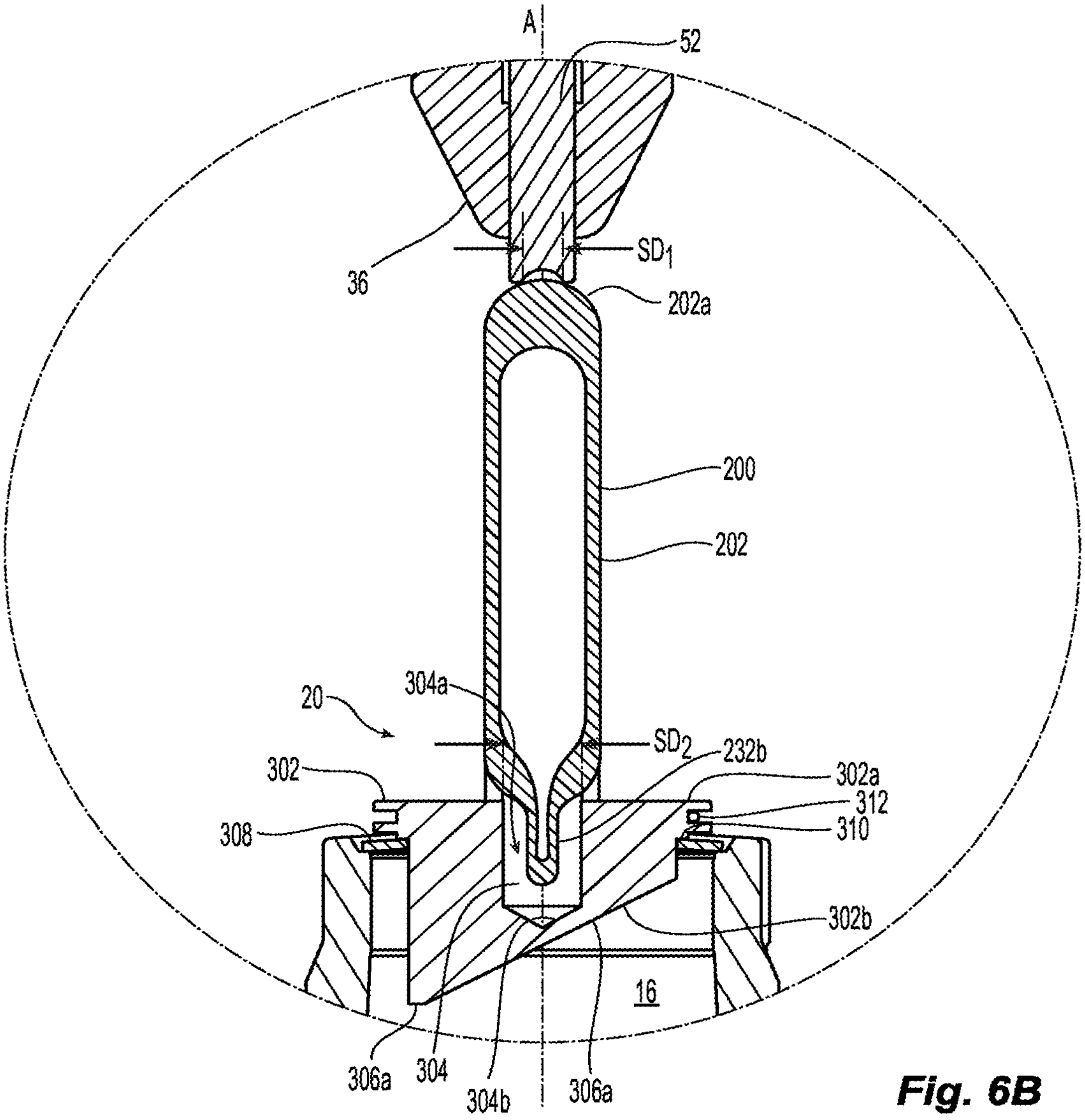
Figure 6C:
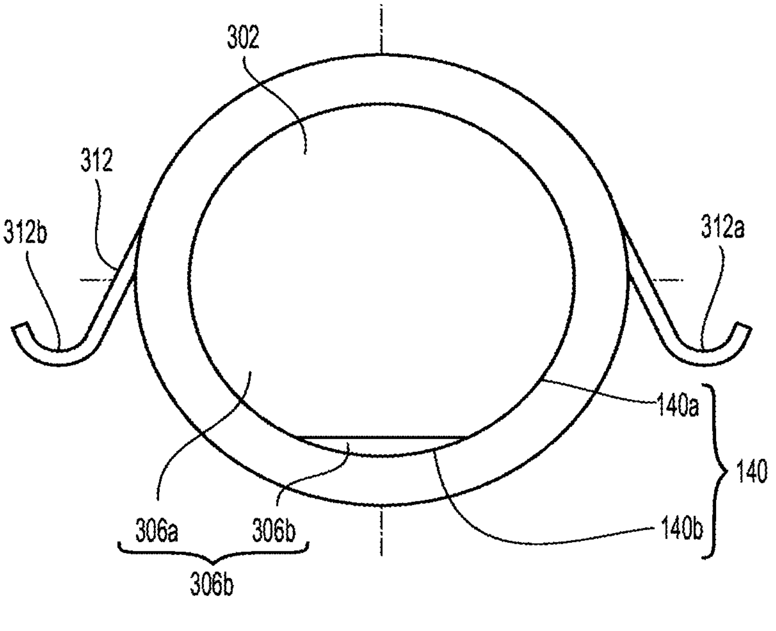
Figure 7:
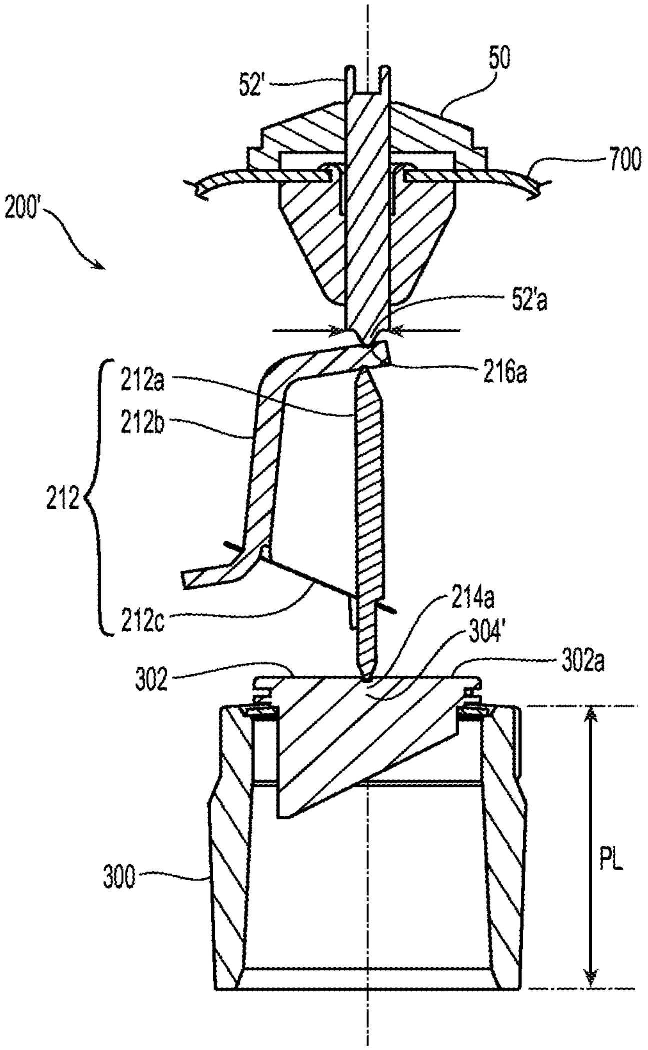
FIG. 7 is a cross-sectional view of the sprinkler assembly in FIG. 5B.

Preferred embodiments of the sealing assembly 300 are shown in FIGS. 6A-6C and preferably include a body 302 having first surface 302*a* facing the deflector and a second surface 302*b* spaced opposite the first for location within the internal passageway 16 of the sprinkler frame 12 to preferably axially align the body 302 along the sprinkler axis A-A. The first surface 302*a* preferably defines a blind bore or hole 304 disposed along the sprinkler axis. The blind bore 304 is defined by an entrance 304*a* formed at the first surface 302*a* and a terminal end 304*b* formed between the first and second surfaces 302*a*, 302*b*. As shown located in the passageway 16, the second surface 302*b* preferably includes a first portion 306*a* oblique to the sprinkler axis A-A and a second portion 306*b* substantially perpendicular to the sprinkler axis A-A. The sealing assembly 300 further preferably includes a metallic annulus 308 disposed on a support surface 310 between the first surface 302*a* and the second surface 302*b* of the body 302 to seal internal passageway 16. The metallic annulus 308 can be embodied as a Belleville Spring, to bias the body 302 distally out of the outlet end 20 of the passageway 16. The annulus 308 is preferably annular having a central portion surrounding the body 302 between the first surface 302*a* and the second surface 302*b*. Upon actuation of the trigger 200, the body 302 is preferably ejected from the passageway 16 and outlet 20 under pressure of the fluid delivered to the inlet 18.

Alternatively or additionally, an embodiment of the sprinkler assembly can include a spring member 312 surrounding the body 302 to facilitate ejection of the annulus and body upon thermal actuation of the trigger 200. The spring member 312 can include a first end 312*a* and an opposite second end 312*b*, as seen in FIG. 6C, which are disposed about the passageway 16. The first and second ends 312*a*, 312*b* are preferably shaped to engage the frame arms 32, 34 to maintain the spring member 312 under tension in the unactuated state of the sprinkler assembly 10. For example, the first and second ends 312*a*, 312*b* of the spring member 312 can engage projections or formations 35*a*, 35*b* formed along the frame arms 32, 34.

As shown in FIGS. 6A and 6B, the heat responsive trigger 200 is preferably embodied as a glass bulb 202 containing a thermally responsive liquid with the bulb 202 having a first end 202*a* and a second end 202*b* to define a trigger axis preferably substantially coincident or aligned with the sprinkler axis A-A. The first end 202*a* of the bulb 202 is preferably contiguous with or under compression of the threaded member 52. The second end 202*b* is preferably disposed within the blind bore 304 of the body 302. The first end 202*a* of the bulb 202 defines a first seat diameter SD1 and the second end 202*b* defines a second seat diameter SD2. The first seat diameter SD1 is preferably less than the second seat diameter SD2. In one particular embodiment of the sprinkler and trigger assembly, the first diameter seat SD1 is about three millimeters (3 mm), preferably equal to the diameter of a spherical recess at the distal end of the threaded member 52. The second diameter seat SD2 is about 5.5 mm, preferably equal to the diameter at the entrance of the blind bore 304. Accordingly, the first and second ends

202*a*, 202*b* preferably define a preferred ratio of first to second seat diameter SD1:SD2 which ranges from about 0.5:1 to about 0.6:1.

The preferred bulb 202 further preferably defines a bulb length BL between the first and second ends 202*a*, 202*b*. The passageway 16 of the sprinkler frame 12 defines a passageway length PL that extends between the inlet end 18 and the outlet end 20. In a preferred embodiment of the sprinkler assembly 10, the bulb length BL is greater than the passageway length PL. In one preferred embodiment of the bulb 202, the bulb length BL is preferably greater than one inch and is more preferably about 1.5 inches (40 mm.). The passageway length PL preferably ranges from about 1.5 inches to about 1.3 inches, is preferably about 1.25 inches and is more preferably 1.28 inches. The glass bulb 202 includes an internal surface to define a inner space for holding the thermally responsive liquid. Accordingly, the bulb 202 preferably defines a wall thickness between the outer and inner surfaces of the bulb. The bulb 202 preferably defines a maximum wall thickness that is less than the difference between the bulb length BL and the passageway length PL. In one preferred embodiment of the bulb 202, the maximum wall thickness is about 1 mm. to define a preferred ratio of maximum thickness to bulb length which can range from 1:30 to about 1:40.

In an alternate embodiment of the sprinkler assembly 10, the trigger 200' can be embodied as a link assembly 212 having a strut 212*a*, a hook or lever 212*b* and thermally responsive link 212*c*. The link assembly 212 is similar to the thermally responsive trigger assembly shown and described in U.S. Pat. No. 8,522,888. In the unactuated state, the strut 212*a* has a first end 214*a* inserted or engaged with an appropriately sized groove 304' formed in the first surface 302*a* of the closure body 302. The lever 212*b* can be fixedly connected at one end to a generally conical end 52'*a* of an alternate threaded member 52' via a second notch 216*a*. The hook 212*b* is coupled to the preferably heat responsive link 212*c* at the other end. The link 212*c* preferably includes two metallic links joined face to face by a thin layer of fusible material. The fusible material can be calibrated to change from a solid state to a liquid state as a function of a fixed temperature or a range of temperatures to provide the desired thermal rating and responsiveness previously described. The lever 212*b* and strut 212*a* provide a mechanical advantage to the link 212*c* so as to reduce the amount of loading imposed on the link 212*c*. The end 52'*a* of the threaded member 52' acts as a fulcrum at the second notch 216*a* so that a force on the link 212*c*, and hence the retention of sealing assembly 300 against fluid pressure in the passage 16 is magnified by the lever 212*b*.

A number of embodiments of the invention have been described. Nevertheless, it will be understood that various modifications may be made without departing from the spirit and scope of the invention. Accordingly, it is intended that the present invention not be limited to the described embodiments, but that it has the full scope defined by the language of the following claims, and equivalents thereof.

What is claimed is:

1. A fire protection system, comprising:
at least one sprinkler, comprising:
a body comprising an inlet, an outlet, and an internal passageway extending between the inlet and the outlet along a sprinkler axis; and
a deflector coupled with the body, the deflector comprising:
a center aligned with the sprinkler axis;
a plurality of tines outward from the center;
a first surface between the center and the plurality of tines; and
at least one second surface forming a groove in the first surface, the deflector to output fluid from the outlet in a rectangular spray pattern such that a density of the fluid decreases from a center of an edge of the spray pattern to a corner of the edge of the spray pattern.

2. The fire protection system of claim 1, comprising:
the rectangular spray pattern comprises a first zone below the deflector and centered about the sprinkler axis, a second zone outward from the first zone relative to the sprinkler axis, and a third zone outward from the second zone relative to the sprinkler axis, the third zone forming the edge, the deflector to output the fluid such that greater than or equal to thirty and less than or equal to thirty five percent of the fluid is distributed in the first zone.

3. The fire protection system of claim 1, comprising:
the at least one sprinkler comprises a frame disposed between the body and the deflector, the deflector coupled with the frame.

4. The fire protection system of claim 1, comprising:
the at least one sprinkler comprises a nominal K-factor ranging from 14.0 gallons per minute (GPM)/((pounds per square inch) (PSI))^(1/2) to 36.4 GPM/(PSI)^(1/2).

5. The fire protection system of claim 1, comprising:
the at least one sprinkler has a working pressure of 30 PSI to 50 PSI given a flow rate of received fluid of 240 GPM.

6. The fire protection system of claim 1, comprising:
the at least one sprinkler is disposed over a storage commodity of at least three feet below the deflector.

7. The fire protection system of claim 1, comprising:
the deflector comprises a convex shape.

8. The fire protection system of claim 1, comprising:
the at least one sprinkler comprises an upright sprinkler.

9. A system, comprising:
a supply pipe; and
a plurality of sprinklers coupled with the supply pipe to receive fluid from the supply pipe, each sprinkler of the plurality of sprinklers having a sprinkler axis, each sprinkler of the plurality of sprinklers comprising:
a working pressure of 30 PSI to 50 PSI;
a body comprising an inlet, an outlet, and an internal passageway extending between the inlet and the outlet along the sprinkler axis; and
a deflector coupled with the body, the deflector comprising:
a center aligned with the sprinkler axis;
a plurality of tines outward from the center;
a first surface between the center and the plurality of tines, and
at least one second surface forming a groove in the first surface,
the deflector structured to output the fluid in a rectangular spray pattern that comprises a first zone below the deflector and centered about the sprinkler axis, a second zone outward from the first zone relative to the sprinkler axis, and a third zone outward from the second zone relative to the sprinkler axis, the deflector to output the fluid such that greater than or equal to thirty and less than or equal to thirty five percent of the fluid is distributed in the first zone and a density of the fluid decreases from a center of an edge of the third zone to a corner of the edge of the third zone.

10. The system of claim 9, comprising:

the deflector of each sprinkler comprises a convex shape, and the rectangular spray pattern is a square spray pattern.

11. The system of claim 9, comprising:

the plurality of sprinklers are disposed over a storage commodity of at least three feet below the deflector.

12. The system of claim 9, comprising:

each sprinkler of the plurality of sprinklers comprises a seal in the outlet, and a thermal trigger coupled with the seal, the thermal trigger comprises a response time index less than 160 $(m*s)^{1/2}$.

13. The system of claim 9, comprising:

the outlet comprises a diameter;

the deflector comprises a radius; and a ratio of the diameter to the radius is between 0.65 and 0.75.

* * * * *